UNITED STATES PATENT OFFICE.

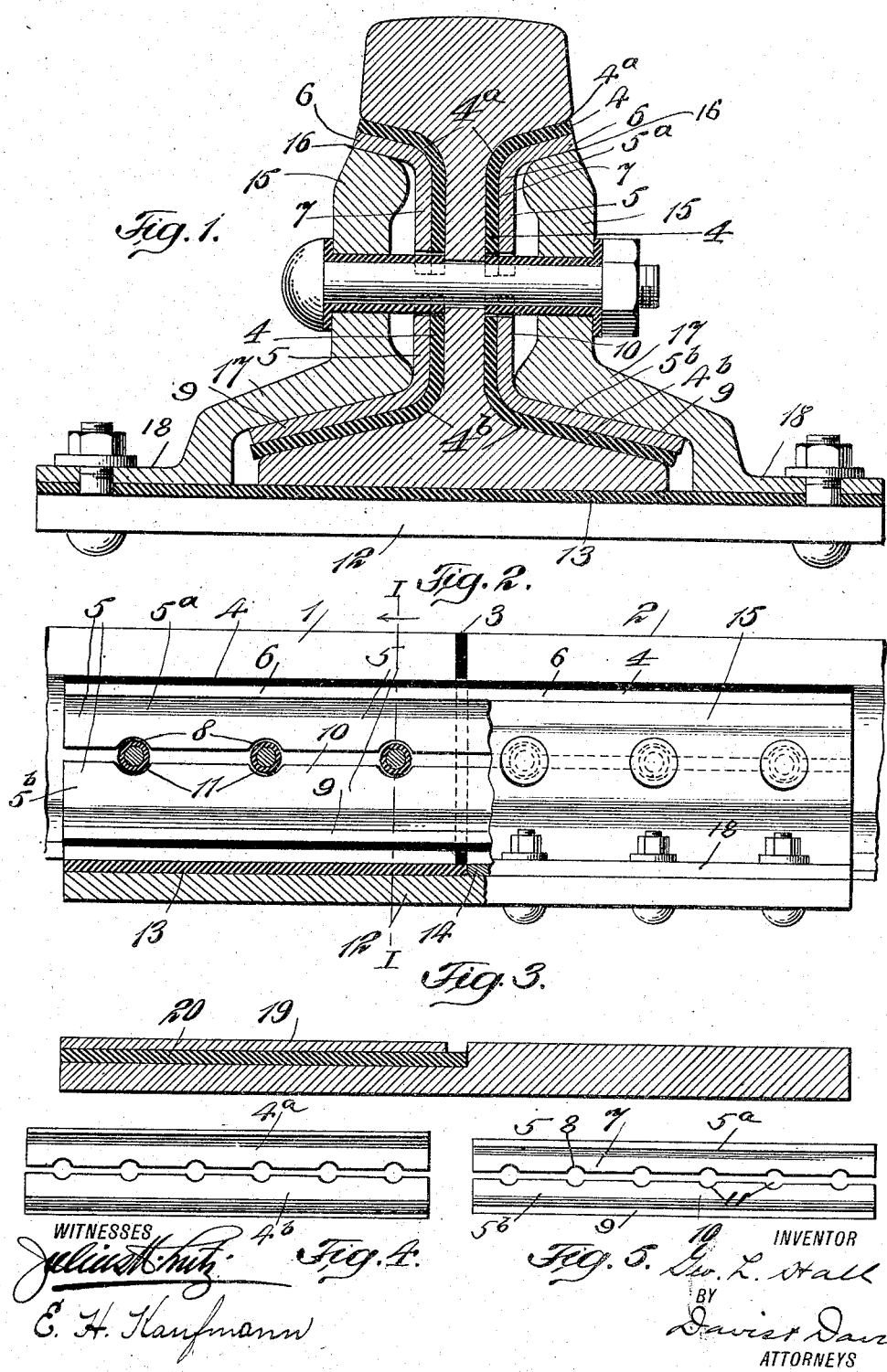

GEORGE L. HALL, OF NEW YORK, N. Y.

INSULATED RAIL-JOINT.

937,369.   Specification of Letters Patent.   Patented Oct. 19, 1909.

Application filed March 26, 1909. Serial No. 486,052.

*To all whom it may concern:*

Be it known that I, GEORGE L. HALL, a citizen of the United States, and resident of the borough of Manhattan, city, county, and State of New York, have invented certain new and useful Improvements in Insulated Rail-Joints, of which the following is a specification, reference being had therein to the accompanying drawings, in which—

Figure 1 is a transverse sectional view of the joint on the line I—I of Fig. 2; Fig. 2 a side elevation, a portion of one of the fish plates being broken away and a portion of the base plate being shown in section; Fig. 3 a longitudinal vertical sectional view of a modified form of base plate; Fig. 4 a detail side elevation showing the two-part insulation; and Fig. 5 a similar view showing the two-part protecting plate.

One of the main objects of this invention is to provide an insulated joint of great durability.

Another object of the invention is to thoroughly protect the insulation from moisture and to maintain it under compression, thereby preventing the disintegration of the insulation and lengthening its life.

Another important object of the invention is to construct the joint of simple parts that may be readily rolled, the splice bars being of the ordinary commercial form.

It will, of course, be understood that I do not wish to be limited to the exact form of splice bars or base support or other parts shown in the drawings and described herein, as other forms may be used within the scope of this invention.

Referring to the various parts by numerals, 1 and 2 designate the rails, the rail 2 receiving the impact of the car wheels as they leave rail 1. Between the two rails is provided the usual insulation 3 which separates the rails from each other. Fitting closely under the head of the rail, against the vertical web thereof and over the base of the rail is the insulation 4. This insulation may be of any desired material, but I preferably use the hard fiber usually employed in insulated rail joints. The insulation is divided longitudinally on the line of the bolts connecting the rails to form an upper portion $4^a$ and a lower portion $4^b$. The adjoining edges of these two portions of the insulation are notched to fit over the bolts or the insulation around the bolts, to prevent longitudinal movement of the insulation.

Bearing against the insulation and pressing closely against the entire outer surface thereof is a thin steel protecting sheath or plate 5. This steel protecting plate bears tightly against the outer surface of the insulation and maintains the insulation under compression and practically sealed against access of moisture, except, of course, at the exposed edges thereof. This protecting plate is formed in two sections $5^a$ and $5^b$. The upper section $5^a$ is formed with the upper portion 6 which extends upwardly and outwardly and fits against the insulation under the head of the rail, and with the lower vertical portion 7 which fits against the insulation along the web of the rail. The lower edge of the portion $5^a$ terminates just below the upper surfaces of the bolts, as shown clearly in Fig. 2, and is notched as at 8 to receive the bolt insulations, as shown in Figs. 1 and 2 and to prevent endwise movement of the plate between the splice bar and the insulation. Both sections of the plate extend the entire length of the splice bars and bridge the joint between the rails.

The lower portion $5^b$ of the protecting plate is formed with the outwardly and downwardly inclined portion 9 which fits over the insulation on the base of the rail; and with the vertical upwardly extending portion 10 which fits closely against the insulation on the web of the rail. The upper edge of the lower portion $5^b$ of the protecting plate is notched as at 11 to prevent any longitudinal movement of that portion of the protecting plate. It will be noted that the sections or portions of the protecting plate are identical in shape with the corresponding portions of the insulation.

It will thus be seen that the insulation is maintained under compression throughout its entire length and breadth and that it is completely protected from moisture and from the disintegrating action of the splice bar. It is also apparent that by dividing the protecting plate and the insulation as described the portions thereof are free to move independently during the adjustment of the splice bars thereon.

The base support consists preferably of a plate 12 provided on its upper surface near one end with a strip of insulation 13 to fit under the end of the rail 1. On its other end it is provided with a raised center portion 14 corresponding in thickness to the insulation 9. This raised portion may be integral with the plate or it may be a separate plate secured thereto, as indicated in Fig. 2 of the drawing, this metal plate or enlargement supporting the adjoining ends of the rail 2. The object of this is to support the rail 2 on material which will not be damaged by the impact as the car wheels travel from rail 1 to rail 2.

The splice bars 15 are each formed with the vertical web of the usual construction, the upper edge 16 thereof bearing against the under side of that portion of the protecting plate which fits against the insulation under the rail head. The splice bars are each provided with the outwardly and downwardly inclined base part 17 which is adapted to bear on the corresponding part 9 of the protecting plate; and with the horizontal outwardly extending flange 18 by means of which they are bolted to the base plate, as shown clearly in Fig. 1.

It will, of course, be understood that I do not wish to be limited to the use of base plates or to the use of splice bars formed with flanges 18.

In Fig. 3 is shown a modified form of base plate in which a bearing plate 19 is secured to an intermediate strip or plate of insulation 20. By this means the fiber is protected and held under compression throughout its entire area, the plate 19 receiving the wear occasioned by the lateral or longitudinal movement of the rail on its support.

Having thus described my invention what I claim as new and desire to secure by Letters Patent is:—

1. In an insulated rail joint the combination of the meeting ends of two rails, insulation fitting closely against the under side of the rail heads, the webs thereof and on the upper surfaces of the bases of the rails, thin protecting means fitting closely against the insulation throughout the entire area of the insulation to maintain said insulation under compression and to protect it from moisture, and a splice bar engaging said protecting means and forcing said means against the insulation, said splice bar engaging said protecting means under the heads of the rails and over the bases thereof.

2. An insulated rail joint comprising sheet insulation adapted to fit under the head of the rail along the web thereof and over the base of the rail, thin metal protecting means fitting closely against the insulation and protecting the same, said metal protecting means being formed with an upwardly and outwardly extending part to fit under the head of the rail and with an outwardly and downwardly inclined part to fit over the base of the rail, and a splice bar adapted to force said protecting means inwardly and to engage said means under the head of the rail and over the base thereof.

3. An insulated rail joint comprising sheet insulation adapted to fit under the head of the rail along the web thereof and over the base of the rail, a thin metal protecting plate fitting closely against the insulation and protecting the same, said protecting plate being divided horizontally to form an upper portion and a lower portion separable from each other, the upper portion being formed with the upwardly and outwardly extending part adapted to fit under the head of the rail and the lower portion being formed with the outwardly and downwardly extending part to fit over the base of the rail and a splice bar adapted to force said protecting plate inwardly and to engage said plate under the head of the rail and over the base thereof.

4. An insulated rail joint comprising sheet insulation adapted to fit under the head of the rail along the web thereof and over the base of the rail, a thin metal protecting plate fitting closely against the insulation and protecting the same, said protecting plate being divided horizontally to form an upper portion and a lower portion separable from each other, the upper portion being formed with the upwardly and outwardly extending part adapted to fit under the head of the rail and the lower portion being formed with the outwardly and downwardly extending part to fit over the base of the rail, the adjoining horizontal edges of these two portions being notched to receive the securing bolts to prevent endwise movement of said portions, and a splice bar adapted to force said protecting plate inwardly and to engage said plate under the head of the rail and over the base thereof.

5. The combination with the meeting ends of two rails, of insulation fitting against the rails under the heads, over the bases and along the webs thereof, thin protecting plates conforming to the shape of the rails and fitting under the heads of the rails, along the webs thereof and over the bases of said rails, said protecting plates holding the insulation rigidly in place against the rail and maintaining said insulation under compression and free from moisture, splice bars engaging the protecting plates under the heads of the rails and over the bases thereof and forcing the same inwardly against the insulation, said splice bars being formed with outwardly extending horizontal flanges at their lower edges, a base support, means for securing the splice bar flanges to said base support, and insulating material carried by said base support under one rail end.

6. An insulated rail joint comprising a sheet of insulation adapted to fit under the head of the rail, along the web thereof and over the base of the rail, said insulation being divided horizontally to form an upper portion and a lower portion separable from each other, a thin metal protecting plate fitting closely against the insulation and protecting the same, said protecting plate being divided horizontally to form an upper portion and a lower portion separable from each other, the upper portion being formed with the upwardly and outwardly extending part adapted to fit under the head of the rail and the lower portion being formed with the outwardly and downwardly extending part to fit over the base of the rail, and a splice bar adapted to force said protecting plate inwardly and to engage said plate under the head of the rail and over the base thereof.

7. An insulated rail joint comprising a sheet of insulation adapted to fit under the head of the rail along the web thereof and over the base of the rail, a thin metal protecting plate fitting closely against the insulation and protecting the same, said protecting plate being formed with an upwardly and outwardly extending part to fit under the head of the rail and with an outwardly and downwardly inclined part to fit over the base of the rail, the insulation and the protecting plate being divided horizontally to form separable sections substantially identical in shape, and a splice bar adapted to engage the protecting plate under the head of the rail and over the base thereof.

8. An insulated rail joint comprising the meeting ends of two rails, insulation adapted to fit under the heads of the rails along the webs thereof and over the bases of the rails, said insulation bridging the joint between the rails, thin metal protecting means fitting closely against the insulation and protecting the same, said protecting means being formed with an upwardly and outwardly extending part to fit under the rail head, and an outwardly and downwardly inclined part to fit over the base of the rail, said protecting means bridging the joint between the rails and extending throughout the length of the insulation, and a splice bar adapted to force said protecting means inwardly and to engage said means under the head of the rail and over the base thereof.

9. An insulated rail joint comprising a sheet of insulation adapted to fit under the head of the rail, along the web thereof and over the base of the rail, said insulation being divided horizontally to form an upper portion and a lower portion separable from each other, a thin metal protecting plate fitting closely against the insulation and protecting the same, said protecting plate being divided horizontally to form an upper portion and a lower portion separable from each other, the upper portion being formed with the upwardly and outwardly extending part adapted to fit under the head of the rail and the lower portion being formed with the outwardly and downwardly extending part to fit over the base of the rail, a splice bar adapted to force said protecting plate inwardly and to engage said plate under the head of the rail and over the base thereof, said splice bar being formed with an outwardly extending flange at its lower edge, a base support, means for securing the splice bar flange to said base support, and insulating material carried by said base support under one rail end.

10. An insulated rail joint comprising a sheet of insulation adapted to fit under the head of the rail along the web thereof and over the base of the rail, a thin metal protecting plate fitting closely against the insulation and protecting the same, said protecting plate being formed with an upwardly and outwardly extending part to fit under the head of the rail and with an outwardly and downwardly inclined part to fit over the base of the rail, the insulation and the protecting plate being divided horizontally to form separable sections substantially identical in shape, a splice bar adapted to engage the protecting plate under the head of the rail and over the base thereof, said splice bar being formed with an outwardly extending flange at its lower edge, a base support, means for securing the splice bar flange to said base support, and insulating material carried by said base support under one rail end.

11. An insulated rail joint comprising sheet insulation adapted to fit under the head of the rail along the web thereof and over the base of the rail, thin metal protecting means fitting closely against the insulation and protecting the same, said metal protecting means being formed with an upwardly and outwardly extending part to fit under the head of the rail and with an outwardly and downwardly inclined part to fit over the base of the rail, a splice bar adapted to force said protecting means inwardly and to engage said means under the head of the rail and over the base thereof, said splice bar being formed with an outwardly extending flange at its lower edge, a base support, means for securing the splice bar flange to said base support, and insulating material carried by said base support under one rail end.

In testimony whereof I hereunto affix my signature in the presence of two witnesses this 25th day of March 1909.

GEORGE L. HALL.

Witnesses:
 WM. R. DAVIS,
 E. H. H. KAUFMANN.